I. YOUNG.
JACKETED KETTLE.
APPLICATION FILED SEPT. 12, 1911.
1,049,794.
Patented Jan. 7, 1913.
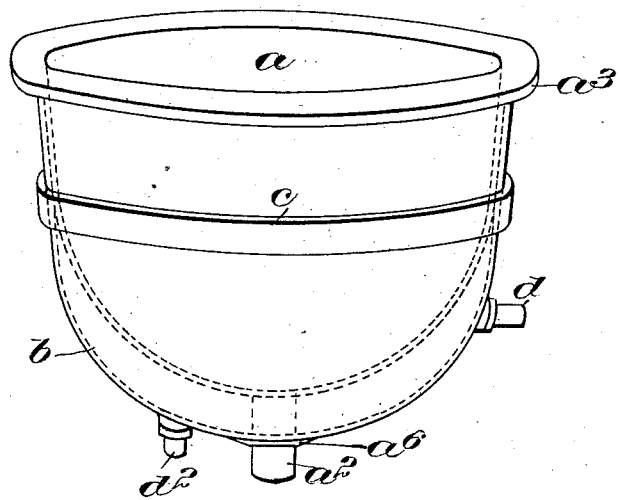
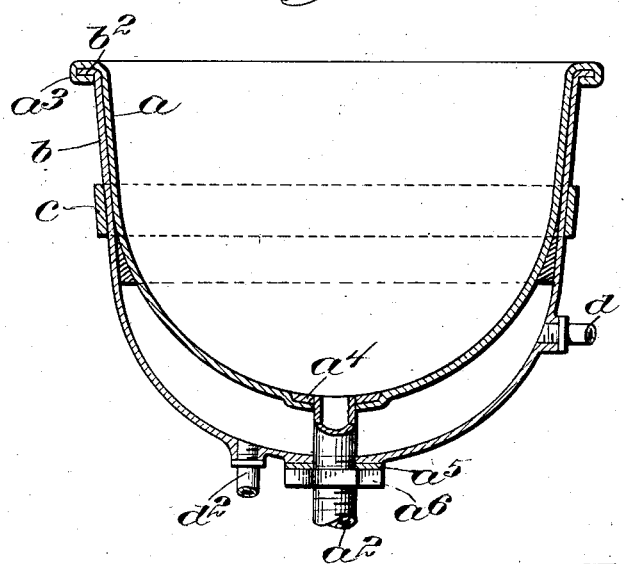

UNITED STATES PATENT OFFICE.

ISAAC YOUNG, OF BOSTON, MASSACHUSETTS.

JACKETED KETTLE.

1,049,794.  Specification of Letters Patent.  Patented Jan. 7, 1913.

Application filed September 12, 1911. Serial No. 648,905.

*To all whom it may concern:*

Be it known that I, ISAAC YOUNG, a citizen of the United States, residing in Boston, in the county of Suffolk and State of Massachusetts, have invented an Improvement in Jacketed Kettles, of which the following description, in connection with the accompanying drawings, is a specification, like letters on the drawings representing like parts.

The present invention relates to a jacketed kettle of the kind commonly used by bakers and confectioners, in which the cooking is done by steam in the jacket, it being the practice, moreover, in some cases to cool the contents rapidly by flowing cooled water through the jacket after the cooking is done. These kettles have commonly been constructed by connecting the shell which forms the jacket with the outside of the kettle near the top by means of rivets, and the rivets rapidly become loosened on account of the pressure in the jacket and the sudden changes in temperature, thereby forming a leaky joint.

In order to form a steam-tight jacket which is capable of standing the high pressure and which will not be loosened by expansion and contraction due to changes in temperature, the jacket of the kettle is formed, in accordance with this invention, of a shell which extends upward to the edge of the kettle and lies in contact with the outer wall of the kettle for some little distance below the edge.

The jacket can be joined to the top of the kettle in any suitable way, the edge of the kettle being preferably spun over a flange formed along the upper edge of the jacket. Those portions of the kettle and jacket which lie in contact with each other may be filled with solder when the parts are assembled, and, in order to bind the two parts firmly together and to form a jacket which cannot be caused to leak, the kettle and jacket are bound together at the top of the jacket space by a ring of metal which is expanded at a high temperature and then shrunk onto the outside of the jacket.

Figure 1 is a perspective view of a kettle embodying the invention, the bottom of the kettle within the jacket being shown in dotted lines; Fig. 2 is a vertical section through the same.

The kettle $a$, which is usually made of copper, is formed in a single piece and comprises an upper annular upwardly diverging straight wall and a converging bottom and is shown as provided at the bottom with a drain pipe $a^2$ which may be secured in the bottom of the kettle in any suitable or usual way. In order to form a steam and water tight joint around the lower part of the kettle for heating or cooling the contents thereof, the jacket member $b$, which is also preferably of copper, and also has an upper annular upwardly diverging straight wall substantially concentric with the straight wall of the kettle and a converging bottom of substantially the same contour as the bottom of the kettle, excepting that its upper straight wall is of slightly greater diameter than the straight wall of the kettle and its bottom is formed somewhat deeper than the bottom of the kettle $a$. In the construction shown, the jacket $b$ is provided along the upper edge with a flange $b^2$, and the kettle $a$ is fitted within the jacket $b$ and joined to said flange by spinning the edge of the kettle over the flange, as indicated at $a^3$. The two parts, as shown, fit tightly against each other for some little distance along their straight walls below the upper edge, and, in assembling the parts, it is practicable to use solder between the walls for the purpose of making as tight a joint as possible. The solder and the spun over connection, however, are not depended upon to stand the pressure and the changes of temperature, the joint between the two parts at the upper portion of the jacket space being reinforced by means of a band $c$ of suitable material, preferably iron, the normal inner diameter of which is slightly less than the outside diameter of the jacket $b$.

In assembling the kettle, the band $c$ is heated to a high temperature, and thereby expanded sufficiently to be driven into place. The said band, upon cooling, will contract and draw the walls of the kettle $a$ and jacket $b$ into firm engagement with each other. The greatest heat to which the kettle is subjected in normal use is insufficient to expand the band to any appreciable extent, and the walls of the kettle and the jacket are thus permanently held with a steam tight fit which is sufficiently strong to withstand any pressure to which the kettle may be subjected in use, the contraction of the kettle and jacket, moreover, when cooled, being insufficient to draw the walls thereof out of close contact with the band $c$.

In the construction shown, the discharge pipe $a^2$ from the kettle $a$ is shown as provided with a flange $a^4$ which may be brazed to the inner surface of the kettle bottom, the said pipe extending through an opening in the jacket $b$ and having a washer $a^5$ and a screw clamping ring $a^6$ to form a tight fit. The jacket is shown as provided with inlet and outlet tubes $d$ and $d^2$ for the circulation of steam and water.

What I claim is:

A jacketed kettle, comprising a kettle having an upper annular upwardly diverging straight wall and a bottom converging from said straight wall, and a jacket having an upper annular upwardly diverging straight wall concentric with and of slightly greater diameter than the straight wall of said kettle and having an outwardly projecting flange at its top, and a converging bottom of greater depth than the bottom of the kettle, the said kettle fitted in said jacket with its straight wall in engagement with the straight wall of the jacket and having its upper edge spun over the flange of the jacket to rigidly unite the kettle and jacket at the top, a sealing composition interposed between the straight walls of said kettle and jacket, and a band shrunk upon the outside of said jacket below the upper edge thereof.

In testimony whereof, I have signed my name to this specification in the presence of two subscribing witnesses.

ISAAC YOUNG.

Witnesses.
JAS. J. MALONEY,
W. E. COVENEY.

Copies of this patent may be obtained for five cents each, by addressing the "Commissioner of Patents, Washington, D. C."